B. SCHAEFER.
STALL-FLOOR.

No. 176,245.        Patented April 18, 1876.

WITNESSES:
C. Neveux
John Goethals

INVENTOR:
B. Schaefer
BY Munn
ATTORNEYS.

UNITED STATES PATENT OFFICE.

BERNHARD SCHAEFER, OF CHICAGO, ILLINOIS.

IMPROVEMENT IN STALL-FLOORS.

Specification forming part of Letters Patent No. 176,245, dated April 18, 1876; application filed February 28, 1876.

*To all whom it may concern:*

Figure 1:
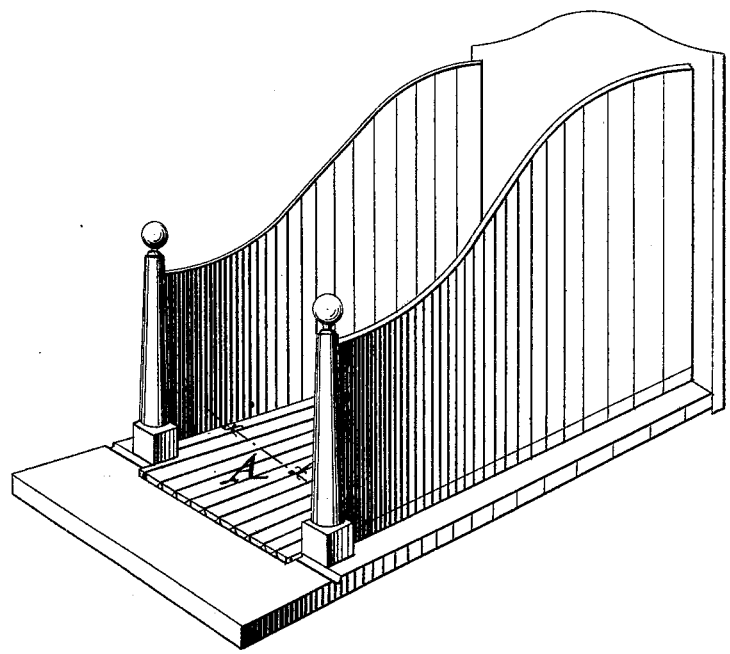
Figure 2:
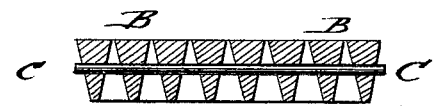
Figure 3:

Be it known that I, BERNHARD SCHAEFER, of Chicago, in the county of Cook and State of Illinois, have invented a new and Improved Stable Floor, of which the following is a specification:

In the accompanying drawing, Figure 1 represents a perspective view of an animal-stall with my improved floor; and Figs. 2 and 3 are, respectively, a vertical transverse section and end view of the same.

Similar letters of reference indicate corresponding parts.

The invention relates to an improved stable-floor, that allows all dust, water, urine, &c., to pass through to the solid floor below, so as to save the bedding, and keep the horse clean and dry, necessitating the cleaning but once a month, so as to save time and money by its use.

The invention consists of a movable floor, laid on the common stable-floor, made of longitudinal wedge-shaped or tapering strips, that are connected by transverse bolts and intermediate wedge-pieces at the ends.

In the drawing, A represents my improved stable-flooring, which is made to cover the entire surface of the stable, being laid throughout on the solid floor below, so that there is not the least danger of the breaking through at any part. The flooring A is made of longitudinal strips B, of the best hard and well-seasoned lumber, laid on the edge. The strips B are made tapering or wedge-shaped, resting with the narrower lower part, throughout the whole length, on the floor, and forming narrow openings of about one-eighth of an inch at the top, to allow the dust, water, urine, &c., to pass through to the floor below. The strips form, with the slightly-pitched floor, a number of narrow gutters, that convey the water, &c., to the main gutter running along the stalls, and covered by the floor. The spaces between the strips admit, also, the free circulation of air underneath the whole floor, which keeps the bedding and horse clean and dry. The strips B are firmly connected by lateral bolts C, that pass through all the strips, the bolts and strips being further tightly bound by short wedge-shaped blocks seated between the strips in the recesses formed thereby.

The floor may be made in two or more longitudinal or lateral sections, as desired, which allows their ready interchanging, when worn, by placing the right side to the left, or the front to the rear, so that every part may be equally worn before requiring a new flooring. The floor below the flooring is cleaned from time to time by raising the sections, and sweeping the dust away.

I am aware that the wedge-shaped strips B are not, of themselves, new for a stall-floor; but

What I claim is—

The combination, with tapered strips B, of the short wedge-shaped blocks and transverse bolts, arranged substantially as and for the purpose specified.

BERNHARD SCHAEFER.

Witnesses:
 MOSES E. GREENEBAUMS,
 FRED. G. FRANK.